Aug. 14, 1962       M. C. THOMPSON       3,048,866
VEHICLE WHEEL WASHER AND BRUSH STRUCTURE
Filed Sept. 21, 1959
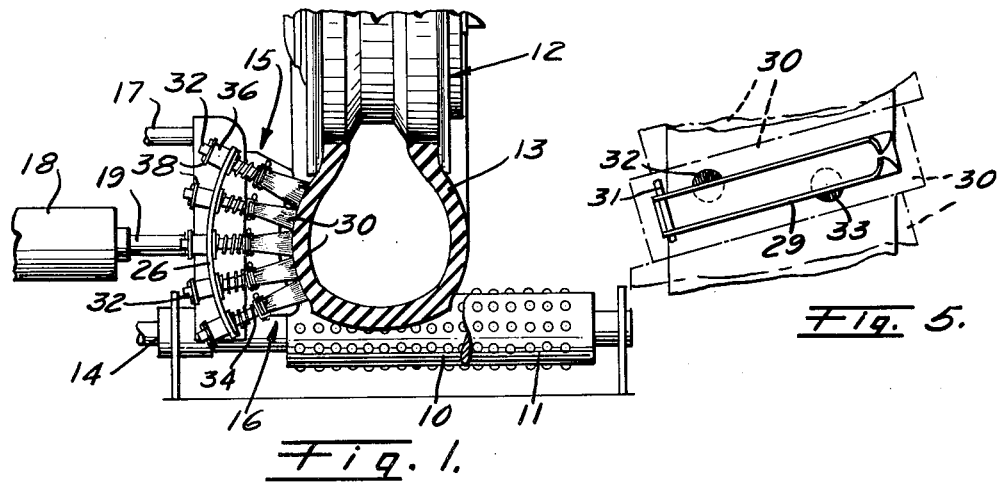
Fig. 1.
Fig. 5.
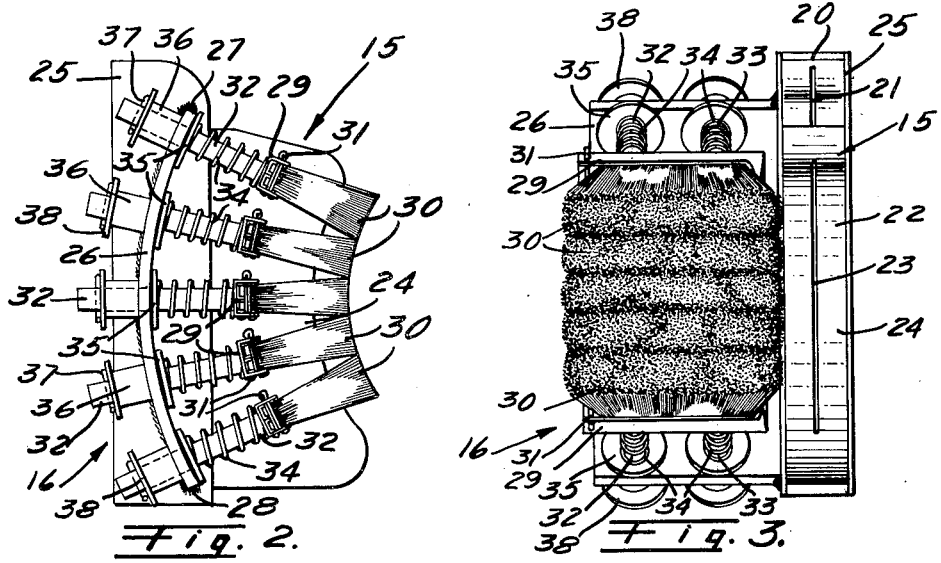
Fig. 2.
Fig. 3.
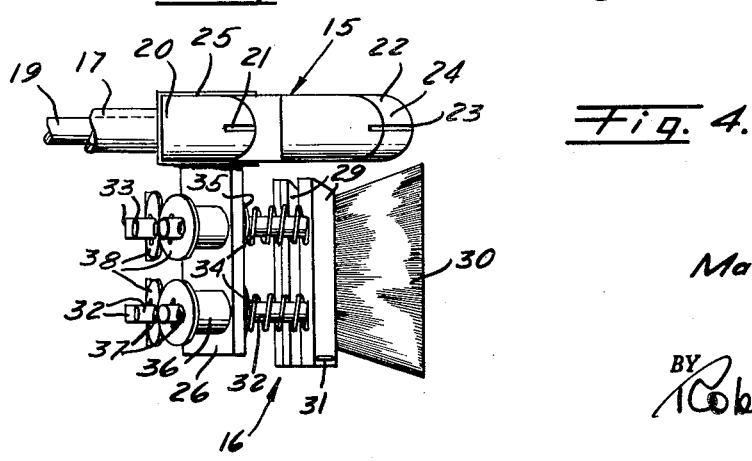
Fig. 4.
Max C. Thompson,
INVENTOR.
BY Robert M. McManigal
Attorney

United States Patent Office 3,048,866
Patented Aug. 14, 1962

3,048,866
VEHICLE WHEEL WASHER AND BRUSH
STRUCTURE
Max C. Thompson, Arcadia, Calif., assignor to Chem-Therm Mfg. Co., Inc., Monrovia, Calif., a corporation of California
Filed Sept. 21, 1959, Ser. No. 841,138
4 Claims. (Cl. 15—21)

The present invention relates generally to automobile laundry equipment, and is more particularly concerned with improved means for the cleaning of the tires and wheels of vehicles, such as automobiles and the like.

Heretofore in auto laundry equipment, it has been difficult if not impossible to obtain mechanical means which will operate more or less automatically and satisfactorily clean the wheels and tires of automobile vehicles.

Solution of the problem has been difficult due to a plurality of causes which arise primarily from the fact that the operation is substantially automatic, and the failure of conventional brushes to conform to the side wall curvatures of the tires. Automobile tire curvatures are not standard, and such curvatures vary in the tires of different manufacturers. Moreover the curvature in tires of the same manufacturer will differ due to unequal air pressure or inflation in the respective tires, and the differing weights of the automobiles with which the tires are utilized. These variables have therefore complicated the solution of the problem, and have emphasized the ineptness of brush structures having straight brushing surfaces, or brush structures having fixed curved surfaces.

Having the foregoing in mind, the present invention in its broad concept seeks to provide a brush structure for the cleaning of vehicle tires which is so constructed that the brushing surface will automatically conform to the radial curvature of the tire.

Another object is to provide in automobile laundry equipment improved wheel and tire washing means which utilizes a contour adjustable brush in combination with a contour steam nozzle.

A further object resides in the provision of a unique contour brush structure having individually sprung sections, whereby the brush will automatically conform to tires having varied contours.

Still another object is to provide a sectional brush in which the various sections may be biased with springs of differing pressures so as to assure that the sections will readily adapt themselves to the tire contour.

Yet another object is to provide as an article of manufacture an improved brush structure having individually biased brush sections which are biased along section axes having converging relation.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view schematically illustrating auto laundry equipment embodying a nozzle and brush combination according to the present invention;

FIG. 2 is an enlarged fragmentary side elevational view of a brush structure according to the present invention;

FIG. 3 is an elevational view looking towards the brushing surface of the brush structure, and the steam discharge nozzle opening;

FIG. 4 is a top plan view of the same; and

FIG. 5 is a view diagrammatically illustrating a modified angular mounting of the brushes.

Referring now specifically to the drawings, for illustrative purposes, there is shown in FIG. 1 wheel washing equipment which includes a pair of laterally spaced wheel rotating rollers 10 and 11 upon which a wheel 12 of a vehicle may be positioned with the wheel tire 13 in engagement with the rollers. One of the rollers, in this case the roller 11, is mounted in bearings for rotation as an idler roller, while the other roller, namely, roller 10 may be rotatably supported and connected with a drive shaft 14 having connections with a suitable power source. Rotation of the roller 10 will thus cause the wheel and connected tire of the automobile to be rotated during a wheel and tire washing operation.

Associated with the tire and wheel rotating equipment, according to the present invention there is provided at one side, namely the outside of the wheel, a movably mounted framework which contains a contour steam nozzle 15 and sectionalized brush structure as generally indicated at 16, as will be more fully described subsequently. The steam nozzle is supplied through a supply pipe 17 from a suitable steam source, and this nozzle together with the brush structure 16 are mounted on a unitary frame structure which may be mechanically moved into and out of a position of use with respect to the tire 13 of the wheel which is being rotated by the rotating rollers 10 and 11. Various mechanical arrangements may be utilized for moving the brush and nozzle combination, and in the present instance, pneumatic means have been illustrated comprising a cylinder 18 and reciprocable piston connected with a projecting piston rod 19 which is connected with the brush and nozzle structure.

As shown primarily in FIG. 4, the steam nozzle is composed primarily of two parts. The supply pipe 17 leads into an elbow 20 which has a slot opening therein, as indicated at 21, for directing a jet of steam upwardly toward the central portion of the wheel 12 for general cleaning of this portion. The elbow 20 connects with a second part 22 having a vertically extending steam discharge slot 23 which is formed in a curved surface 24 having a generally arcuate contour which conforms generally to the radial curvature of the side wall of the tire on the wheel which is to be cleaned. The nozzle structure 15 is supported between the walls of an upstanding channel frame member 25 which is supported for movement with the supply pipe 17 by operation of the piston rod 19 which is connected to the channel frame member.

The brush structure 16 comprises a unitary assemblage which is mounted upon an arcuate support 26 constructed of an elongate strip of metal which is longitudinally curved. This support is secured to the adjacent wall of the channel frame member 25 by an appropriate means, and for simplicity has been shown as being welded at its upper and lower ends as indicated by the numerals 27 and 28. It will thus be apparent that actuation of the piston rod 19 will operate to move the channel frame member 25 and connected brush structure towards and away from the tire which is to be cleaned.

Considering now more specifically the construction of the brush structure 16, it will be noted that this brush structure is comprised of individually sprung sections in which the brushes of the respective sections cooperate to provide an adjustable contour brushing surface which will automatically be conformed to the variable contours of the automobile tires which are to be cleaned.

Each section is similarly constructed, and it is believed that it will be sufficient to describe only one of these sections. As shown, each brush section comprises a brush holding channel member 29 which extends transversely with respect to the longitudinal axis of the support 26. This channel member has tufts 30 of bristles anchored therein to form one of the brush sections. These bristles may be constructed of any suitable material, and for this purpose brushes of stainless steel have been used and proven satisfactory for the purpose. The tufts 30 forming the brush sections may be removably secured in the channel 29 by partially closing one end of the channel by bending inwardly the end edges of the side walls. By leaving the other end of the channel open, the tufts or brush sections may be inserted endwise into the channel and then retained in place by means of a cotter pin 31, or other suitable means.

As shown primarily in FIG. 4, the channel member 29 is provided with a pair of parallel projecting studs 32 and 33 which are parallel and extend through suitable openings in the support 26 with outmost ends projecting on the opposite side of the support from that on which the brushes are positioned. These studs reciprocably support the channel member 29 and associated brush sections 30 for movement towards and away from the support 26. Around each of the stud members, there is positioned a compression spring 34, this spring having one end bearing against the adjacent channel member, and the other end acting against the support 26 one or more washers 35 being positioned between this end of the spring and the support. The compression springs thus act to move the brushes towards the tire in a direction away from the support 26. This movement, however, is limited by providing tubular spacers 36 for the projecting ends of the studs and utilizing cotter pins 37, or other suitable means, at the stud ends for abutment against an intervening washer 38 so as to limit the reciprocal movement under the action of the compression springs. It will be apparent that the utilization of spaced studs such as studs 32 and 33 will serve to hold the brush section in proper position and provides a simple means for preventing twisting or canting movements of the brush sections.

Viewing the general arrangement of the brush assembly, as seen in FIG. 2, it will be noted that the brush sections are thus mounted on one side of the support 26, and that the brush sections are reciprocably movable about axes which are in converging relation towards the side on which the brushes are positioned. With this arrangement, the brushes will be relieved with respect to each other as they are moved away from the tire side wall in a direction towards the support 26, and conversely, when the brushes are moved towards the tire, they will move into closer association, and will automatically conform to the contour of the tire side wall so that the entire side wall area will thus be engaged by the brush sections.

In the arrangement which has been illustrated, a single washer 35 has been shown in each case between the compression spring and the adjacent support 26 for each of the sections. As a modification of this arrangement, by increasing the number of washers 35 for the sections in going from the central sections toward the end sections, the spring biasing pressures for the sections may be graduated so that the endmost sections will not be as easily depressed as the more central sections. This will thus assure that the endmost sections remain fully extended until after the intermediate sections have been conformed to the contour of the tire side wall.

While it is contemplated that the brush holding channel members 29 will usually be arranged to extend transversely and at a right angle to the longitudinal axis of the support 26, the channel members 29 may be skewed by mounting at some other angle than ninety degrees. As shown more or less diagrammatically in FIG. 5, the projecting studs 32 and 33 may be secured to the opposite edges of the associated channel member, thus positioning the channel at a slight angle. With this arrangement, the opposite ends of the brushes will be disaligned and brushing paths of adjacent brushes will be overlapped.

By utilizing the sectionalized adjustable contour brush and the contour steam nozzle in the above described combination, the disadvantages of conventional arrangements have been overcome, and a very efficient and effective wheel cleaning arrangement provided which is eminently suited for use in auto laundry equipment.

Various modifications may suggest themselves to those skilled in the art without departing from the spirit of my invention, and, hence, I do not wish to be restricted to the specific form shown or uses mentioned except to the extent indicated in the appended claims.

I claim:

1. A washer mechanism for vehicle wheels having tires thereon, comprising the combination of: a brush engageable with a side of a tire on at least one of said wheels, said brush having a plurality of individually sprung tuft carrying sections successively positioned generally in a radial direction outwardly from the wheel axis and extending generally transversely to a wheel radius, said sections respectively being biased in a direction towards said tire, the tufts of said sections coacting to form a substantially continuous curved tire engaging brushing surface adapted to substantially conform to the adjacent engaged surface of the tire; and means for relatively moving said tire and brush means.

2. A washer mechanism for vehicle wheels having tires thereon, comprising the combination of a brush engageable with a side of a tire on at least one of said wheels, said brush means having a plurality of individually sprung tuft carrying sections successively positioned generally in a radial direction outwardly from the wheel axis and extending generally transversely to a wheel radius, said sections respectively being biased in a direction towards said tire, the tufts of said sections coacting at their outermost ends to form a substantially continuous curved tire engaging brushing surface adapted to substantially conform to the adjacent engaged surface of the tire; a steam nozzle on the leading side of said brush means having a curved steam outlet opening conforming substantially to the radial curvature of the adjacent tire surface and an upper outlet above the curved outlet for directing a jet of steam towards the wheel axis; and means for relatively moving said tire with respect to said brush means and nozzle.

3. A washer mechanism for vehicle wheels having tires thereon, comprising the combination of: brush means engageable with a side of a tire on at least one of said wheels, said brush means having a plurality of sections successively positioned generally in a radial direction outwardly from the wheel axis; springs respectively biasing each section in a direction towards said tire, the springs for the respective sections having progressively greater biasing force outwardly from the innermost sections to the endmost sections; and means for relatively moving said tire and brush means.

4. As an article of manufacture, a tire cleaning brush structure, comprising: an elongate longitudinally curved support; a plurality of transversely extending brush assemblies laterally spaced along the length of said support, said brush assemblies coacting to form a composite brush having a curved brushing surface adapted to substantially conform to the radial side wall curvature of a tire; a stud carried by each of said assemblies extending through and reciprocable in a passage in said support; a compression spring between each brush assembly and said support acting to bias the assembly away from said support, the biasing force of said springs being of increasing amount towards the ends of said support; and abutment means for limiting the biased movement of said brush assembly by said spring.

References Cited in the file of this patent

UNITED STATES PATENTS

| | | |
|---|---|---|
| 583,677 | Farrand | June 1, 1897 |
| 678,992 | Barlow | July 23, 1901 |
| 1,494,328 | Arnandez | May 20, 1925 |
| 1,823,222 | Whitsitt | Sept. 15, 1931 |
| 2,712,145 | Karnes | July 5, 1955 |
| 2,814,825 | Guthrie et al. | Dec. 3, 1957 |